US006647017B1

(12) United States Patent
Heiman

(10) Patent No.: US 6,647,017 B1
(45) Date of Patent: Nov. 11, 2003

(54) SWITCHING FABRIC ARRANGEMENT WITH TIME STAMP FUNCTION

(75) Inventor: Petri Heiman, Vantaa (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/480,100

(22) Filed: Jan. 10, 2000

Related U.S. Application Data

(63) Continuation of application No. PCT/FI98/00593, filed on Jul. 14, 1998.

(30) Foreign Application Priority Data

Jul. 14, 1997 (FI) .................................................. 972978

(51) Int. Cl.[7] .............................................. H04L 12/56
(52) U.S. Cl. ....................... 370/412; 370/428; 370/417; 370/395.7; 370/429; 370/430; 370/395.31
(58) Field of Search ............................... 370/412, 395.7, 370/417, 428, 429, 430, 229, 395.31, 388, 389

(56) References Cited

U.S. PATENT DOCUMENTS

| | | | |
|---|---|---|---|
| 5,337,308 A | 8/1994 | Fan | 370/388 |
| 5,339,311 A | 8/1994 | Turner | 370/394 |
| 5,481,536 A | 1/1996 | Reisch et al. | 370/394 |
| 5,485,457 A | 1/1996 | Aramaki | 370/238 |
| 5,537,400 A * | 7/1996 | Diaz et al. | 370/412 |
| 5,612,952 A * | 3/1997 | Motoyama | 370/412 |
| 5,745,489 A * | 4/1998 | Diaz et al. | 370/395.7 |
| 5,859,835 A * | 1/1999 | Varma et al. | 370/412 |
| 6,134,217 A * | 10/2000 | Stiliadis et al. | 370/428 |
| 6,188,697 B1 * | 2/2001 | Umehira et al. | 370/412 |
| 6,404,737 B1 * | 6/2002 | Novick et al. | 370/395 |

FOREIGN PATENT DOCUMENTS

| | | |
|---|---|---|
| EP | 0 497 097 | 8/1992 |
| WO | 91/02419 | 2/1991 |

* cited by examiner

*Primary Examiner*—Wellington Chin
*Assistant Examiner*—Chuong Ho
(74) *Attorney, Agent, or Firm*—Squire, Sanders & Dempsey L.L.P.

(57) ABSTRACT

The invention relates to a switching fabric arrangement for a packet-switched telecommunications network. Packets arriving at the switching fabric are assigned a time stamp depending on their time of arrival. Time stamp information relating to the packets to be transported is transmitted to at least some of the switching elements, and in at least some of the switching elements, the relative order of the packets to be sent is established on the basis of the received time stamp information in such a way that on each outgoing link (IL) from the switching element, the packets are in the sequence indicated by the time stamps. To enable the re-sequencing the be implemented simply and further in such a manner that the switching fabric can be easily expanded, a predetermined number of discrete values are used as time stamps, and in switching elements in which the relative order of the packets to be sent is established on the basis of the time stamps (a) time stamp-related buffers (RSB) are used, (b) incoming packets are stored in the time stamp-related buffers in such a way that at least each packet arriving from outside the switching fabric is stored in the buffer corresponding to its time stamp, and (c) the time stamp-related buffers are read one buffer at a time to be empty and each packet that is read out is routed to the output indicated by the address contained therein.

9 Claims, 5 Drawing Sheets

SWITCHING FABRIC ARRANGEMENT WITH TIME STAMP FUNCTION

Figure 1:
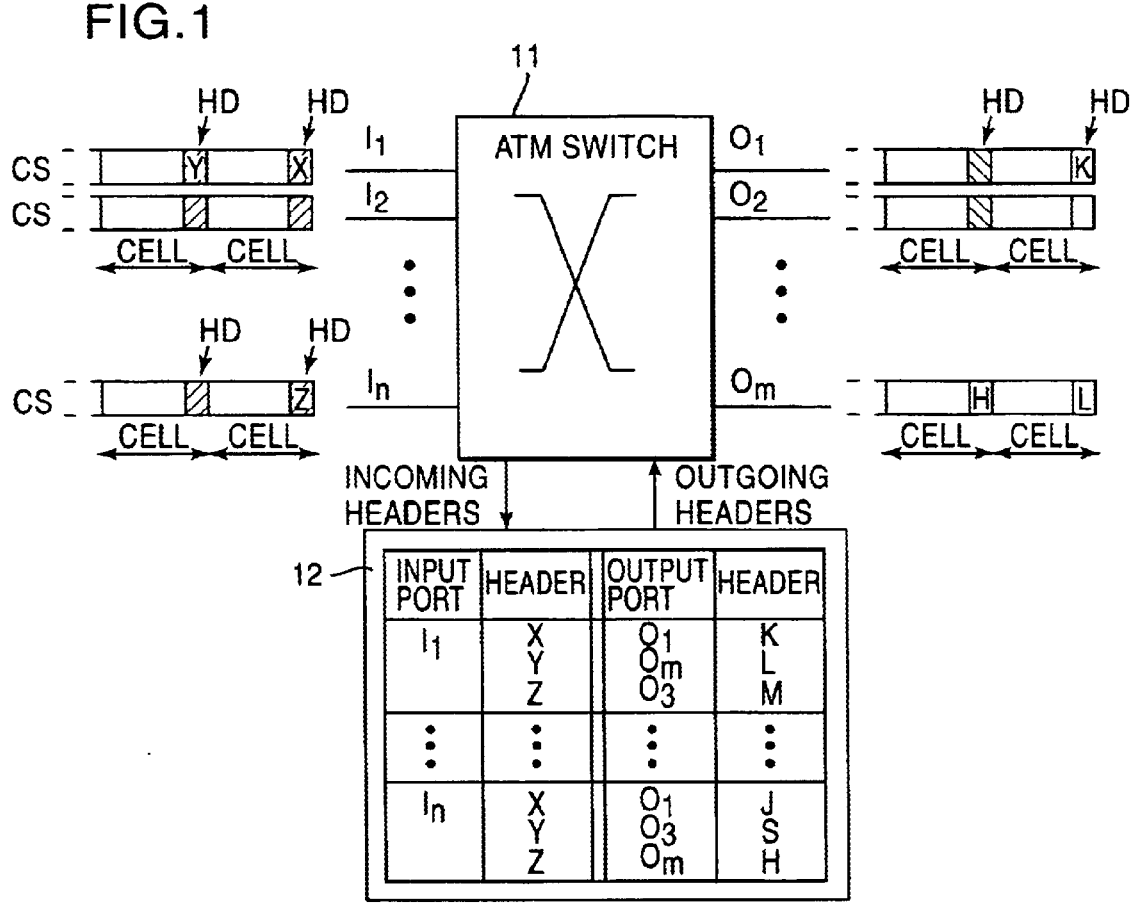

This application is a con't of PCT/FI98/00593 filed Jul. 14,1998.

FIELD OF THE INVENTION

The invention relates generally to switching implemented in a packet-switched telecommunications network. More particularly, the invention relates to a switching fabric arrangement used in such a network, specifically an ATM network.

BACKGROUND OF THE INVENTION

To aid the understanding of the following description, some terms to be used later will first be defined.

A switching fabric or switching matrix (both terms are used) is comprised of a plurality of switching elements which are either identical or dissimilar and are interconnected according to a given topology. In the (English-language) literature of the art, such a switching matrix may also be called a "switching network", since the switching elements form a network having the given topology. Hence, a switching matrix is considered to have a defined form when its switching elements and their interconnections are known.

A switching fabric is composed of switching elements by-connecting a number of switching elements into a network comprising switching elements in parallel and in succession. Parallel switching elements make up one switching stage. Switching elements in successive switching stages are interconnected by internal links in accordance with the above topology.

The term switch is used to denote the entity configured about a switching matrix. Hence, a switch can denote any means employed for signal switching in a communications network. In the present context, a switch is a packet switch as the invention is related to switching in a packet-switched telecommunications network, particularly an ATM network. A switch is also sometimes termed a switching system.

ATM (Asynchronous Transfer Mode) is a connection-oriented packet-switching technique, which has been selected by the international organization for telecommunications standardization, ITU-T, as the target transfer mode solution for implementing a broadband multimedia network (B-ISDN). In an ATM network, the problems of conventional packet-switched networks (such as X.25 networks) are overcome by transmitting short packets of a constant length (53 bytes) called cells. Each cell comprises a 48-byte payload portion and a 5-byte header. The header comprises, along with other data, address information on the basis of which the cell is routed in an ATM network. Further discussion of an ATM network herein will be omitted as non-essential subject to the understanding of the invention. When required, a closer description of this topic can be found in international standards and textbooks of the art.

Switches in a conventional TDM network (Time Division Multiplexing, also called by the name STM, Synchronous Transfer Mode) cannot be directly implemented to handle the switching in an ATM network. Neither are the switching solutions developed for conventional packet networks usually suitable as switches for an ATM network. The selection of an optimum ATM switching architecture is influenced not only by the fixed cell size and the limited functionality of the cell header but also by the statistical behaviour of the cell stream and the fact that an ATM switch must operate at a very high rate (currently typically about 150 . . . 600 Mbit/s).

FIG. 1 shows schematically an ATM switch seen from the outside. The switch has n input lines $I_1 \ldots I_n$ and m output lines $O_1 \ldots O_m$. A cell stream CS arrives over each input line to the ATM switch 11. The header of an individual cell in the data stream is denoted by the reference HD. In the ATM switch, the cells are switched from the input line $I_j$ to the output line $O_j$, and simultaneously the value of the cell header is translated from an incoming value to an outgoing value. For this purpose, the switch includes a translation table 12 by means of which said header translation is made. It is to be seen from the table that, for example, all the cells received over line $I_1$ and having a header with a value X are switched onto output line $O_1$ whereby their header is simultaneously given the value K. Cells present on different input lines may have headers of equal value; for example, cells received at input line $I_n$ with the same header value X are also switched onto output line $O_1$, but their header is given the value J on the output line.

Hence, the main tasks of a switch are transfer of cells (packets) from the input line to the desired output line, and header translation. Occasionally, as is also evident from the figure, two cells may be simultaneously contending for access onto the same output line. For this purpose, the switch must have buffering capacity to avoid the necessity of discarding cells in such a situation. Hence, the third main task of a switch is to provide buffering. The manner in which these three main tasks are performed and in which part of the switch the implementation is handled distinguishes different switching solutions from one another.

ATM switching fabrics, on the other hand, can be subdivided into two classes depending on whether the switching elements used in the fabric are buffered or unbuffered.

In a fabric using unbuffered switching elements, routing of cells through the fabric operates at the cell level in such a way that a route is separately selected for each cell irrespective of which virtual channel the cell belongs to. In simplified rendition, proceeding of cells through the fabric may be thought of as comprising two steps. In the first step, the cells are sent from the input ports through the fabric and in the second step either the switching elements or the output ports give an indication to the input port which cells were successful in traversing the fabric. The latter step must be performed, since if the cells possibly attempt to use the same internal link of the fabric, all simultaneous cells except one must be discarded since the switching elements have no buffers. The problem with such a switching fabric is that the operation of all its elements must be mutually synchronized, i.e., all elements and input and output ports must be in the above-described steps at the same time. Since cell transmission is very rapid and in practice even several further steps may be necessary besides the two described above, synchronization cannot be achieved merely by means of handshaking signals between the elements, but all elements must be synchronized from a common clock source, and it is difficult to distribute the clock signal to all elements if the switching fabric is very broad and it has been necessary to divide it among several plug-in units. It may also be noted that even a switch provided with non-buffered switching elements must have buffering capacity either in the input or in the output ports of the fabric to avoid the need of discarding cells contending simultaneously for the same output line of the switch.

A switching fabric comprised of buffered switching elements does not have the above synchronizing requirement.

The selection of the route of the cells through the switching fabric can be virtual channel-related. For this purpose, however, a record of the load on the internal links of the switching fabric must usually be kept. A buffered switching fabric is usually blocking at the connection level, as to construct it to be non-blocking usually requires so much extra capacity that this is no longer economically feasible. In a blocking fabric, the selection of the route for the connection is a highly critical factor when it is attempted to reduce the blocking.

On account of the foregoing, many manufacturers have sought a solution from a method in which the route is selected at the cell level also in a switching fabric provided with buffered switching elements. To avoid the necessity of keeping a record of the load on the internal links of the fabric and to enable even distribution of the load, the cell route is usually selected at random. (The selection may also be done in accordance with a suitable non-random algorithm.). In that case, the switching fabric can be constructed to be non-blocking at reasonable cost.

Since the route of the cells varies in such random routing, it is possible that a cell sent later travels faster through the switching fabric and overtakes a cell sent earlier. This is due to the fact that the load on the switching elements and thereby also the fill rates of their buffers vary constantly, and hence also the dwell time of the cell in the fabric varies at different times and over different routes. Restoring the order of the cells necessitates special solutions known as re-sequencing.

In principle, there are two basic solutions for cell re-sequencing depending on which part of the switching fabric the re-sequencing is performed in. The cells can be re-sequenced either after the switching fabric in re-sequencing (micro)circuits provided for this purpose (alternative 1), or the re-sequencing can be performed already within the switching fabric between its switching stages (alternative 2).

There are several variations of the first alternative; one embodiment is disclosed in U.S. Pat. No. 5,481,536.

The factor common to the above solutions is that the transit time used by the cell in traversing the switching fabric (alternative 1) or to the switching elements (alternative 2) is measured for example by using a time stamp, and thereafter the cell is delayed for a time sufficient for a predetermined maximum time limit to be exceeded. This ensures that the delay of all cells through the switching fabric remains the same. The drawback of these solutions, however, is that they require a very complex circuit using parallel processing at the output ports of the switching fabric (alternative 1) or in the switching elements (alternative 2).

U.S. Pat. No. 5,337,308 discloses a solution relating to alternative 2, in which a time stamp dependent on the time of arrival is attached to each cell arriving at the switching fabric. The time stamps of the cells at the head of the input buffers are monitored within the switching fabric in a discrete switching element, in order to find the minimum value of these time stamps. When one of the output buffers is empty, an idle cell is generated in lieu thereof, the time stamp of which is given said minimum value. By means of these idle cells, the switching element can provide time information to a switching element in the next switching stage, and on the basis of this information the element in the next stage is able to order, with minimum delay, the cells (packets) in the element in the correct sequence and to forward them in the correct order.

The principal drawback of the solution disclosed in this U.S. Patent also resides in the, heavy comparison operations required by the re-sequencing of the cells. When an input buffer receives a cell, the time stamp carried by said cell is compared with the time stamps of the cells at the head of all other input buffers. On the basis of the comparison, the cell with the smallest time stamp is found, as a result of which a transfer command to transfer the cell out from the buffer is given to said buffer. Hence, N comparisons must be performed per each cell to be transferred, N being the number of links to and from the switching element.

A re-sequencing solution differing from the one described above is disclosed in U.S. Pat. No. 5,485,457. This solution makes use of the three-stage structure of the switching fabric, in which case the cells can still be relatively easily ordered in the third stage, even though the solution requires computationally heavy comparison operations in the switching elements of the third stage to find the smallest time stamp in each case. In this solution, the first switching stage is unbuffered and an empty cell indicating the emptying of a given buffer in the second switching stage is sent from said second switching stage to the third switching stage to reduce the switching delay.

The drawback of this solution, in addition to the heavy comparison process it requires, is the fact that it does not permit flexible expansion of the switching fabric (flexible increasing of the number of switching elements and/or switching stages).

SUMMARY OF THE INVENTION

It is an object of the present invention to eliminate the drawbacks described above and to provide a method wherewith the re-sequencing of packets can be implemented more simply than heretofore and also in such a manner that the switching fabric can be easily expanded.

This object is achieved with a solution as defined in the independent claim.

The idea of the invention is to utilize as time stamps a predetermined number of discrete values, and to use time stamp-related buffers into which the packets are stored in such a way that each incoming packet is stored in the buffer specific to its time stamp. The time stamp-related buffers are emptied by reading one buffer at a time.

To minimize the delay, it is advantageous to use in connection with such a re-sequencing arrangement a basic solution of the kind described above, in which a time stamp dependent on the time of arrival is attached to each incoming packet (or cell), and by means of padding packets internal to the switching fabric, time stamp information that is substantially continuous and is formed on the basis of the time stamp information arriving at the switching element is transmitted from one switching element to another, independently of the arrival of data packets.

In accordance with another preferred embodiment of the invention, packets are read out from the input buffers of the switching element into time stamp-specific buffers, simultaneously maintaining information on the smallest time stamp the packet corresponding to which has been read out from the input buffers at each time. The packets are read out from the time stamp-specific buffers utilizing this value in such a way that in each case, a time stamp-specific buffer whose specific time stamp is smaller than or equal to the above smallest time stamp, is read.

The solution of the invention offers a clear-and simple re-sequencing method and does not require high parallelism (complexity) from the circuit implementation. All switching elements can have similar implementation, and thus the fabric can be easily enlarged almost without limit, as long as it is ensured that the maximum delay of the cells will not become too long.

Moreover, the solution in accordance with the invention does not require high buffering capacity in the switching element, for example the input buffers can comprise only one cell. Furthermore, by means of the solution the switching delay occasioned by the switching fabric will be made small, since the time information enabling the re-sequencing can be rapidly transmitted from one switching element to another.

LIST OF DRAWINGS

Figure 2:
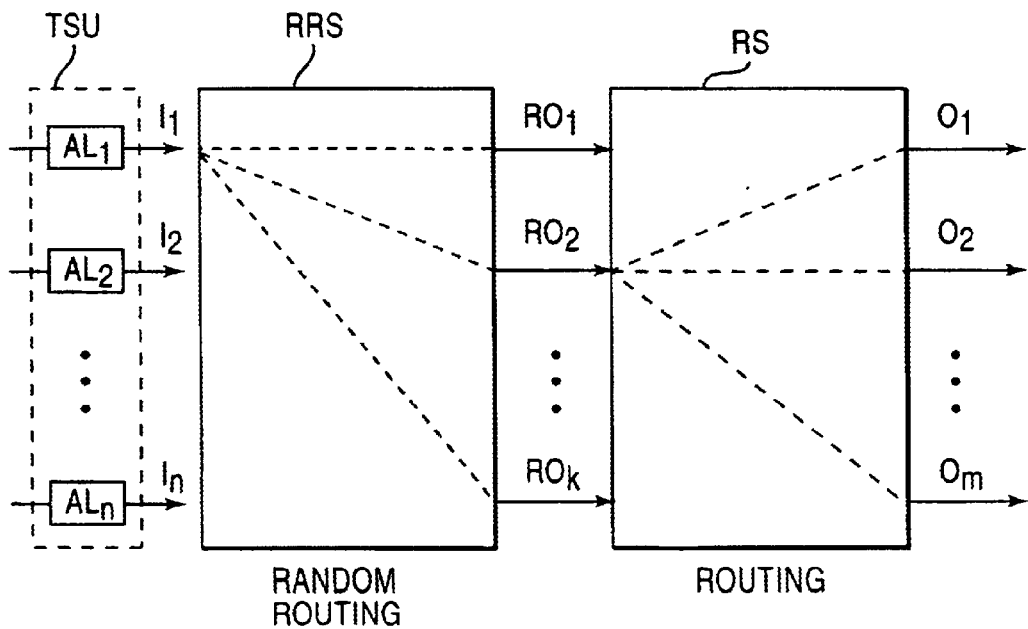
Figure 3:
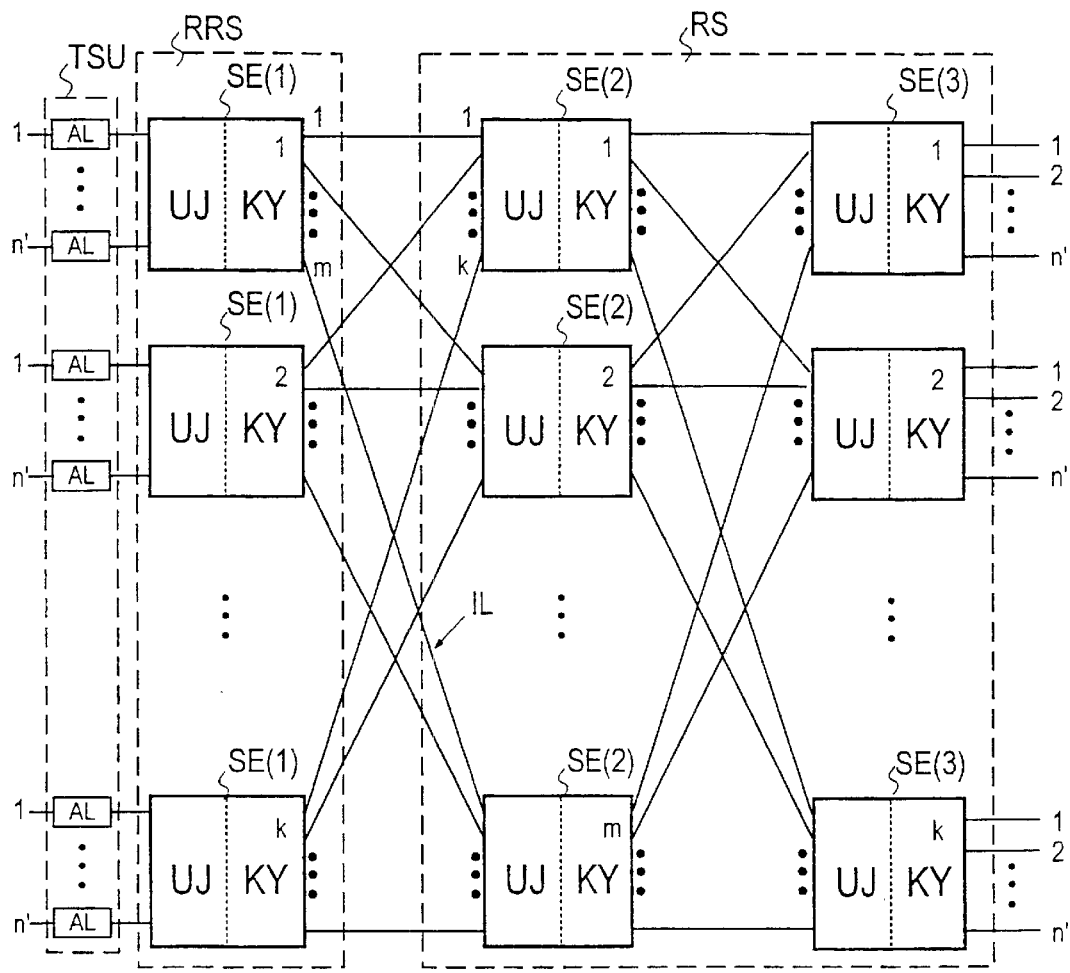
Figure 4:
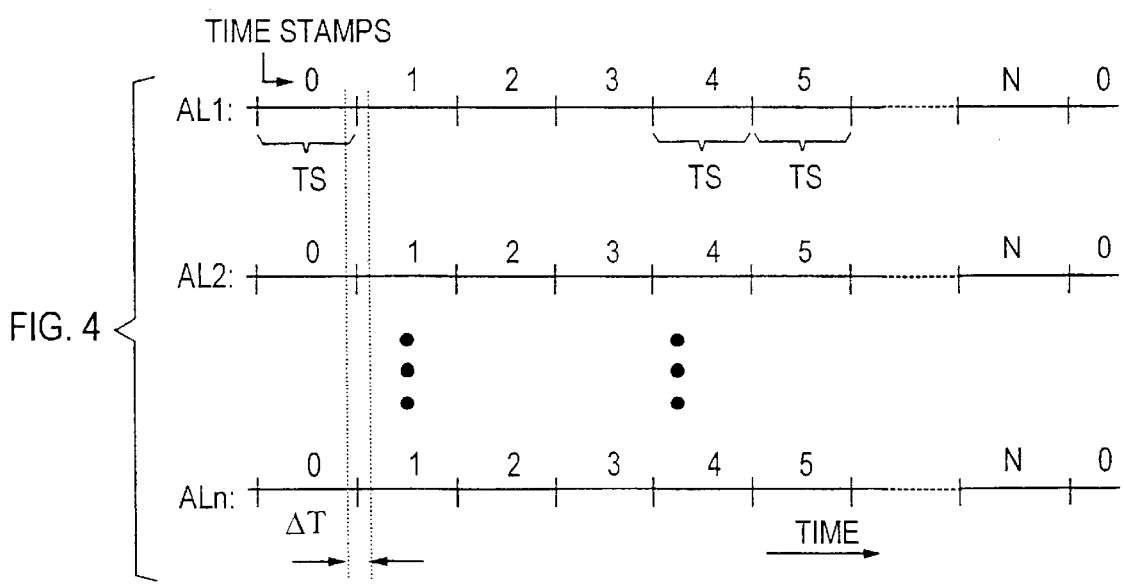
Figure 5:
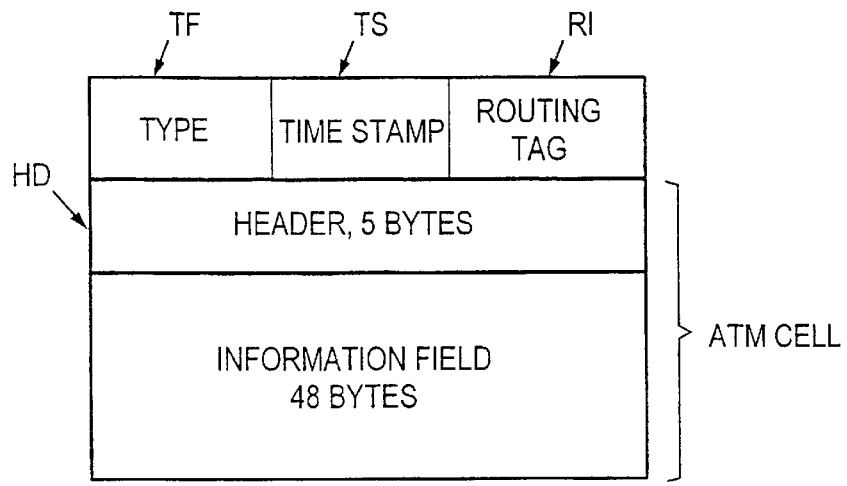
Figure 6A:
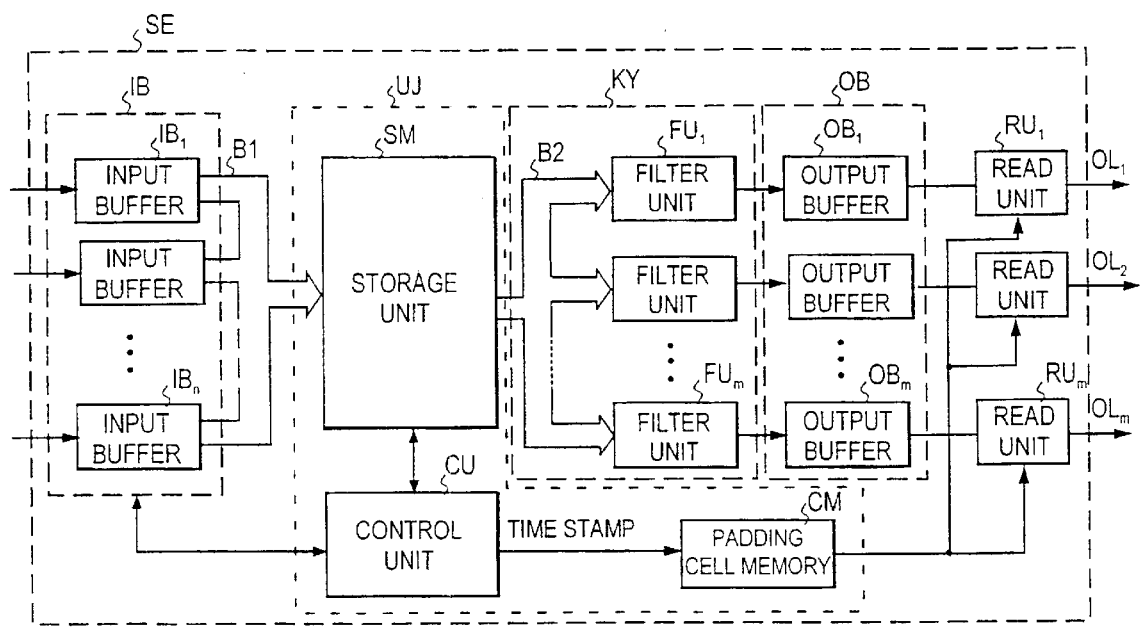
Figure 6B:
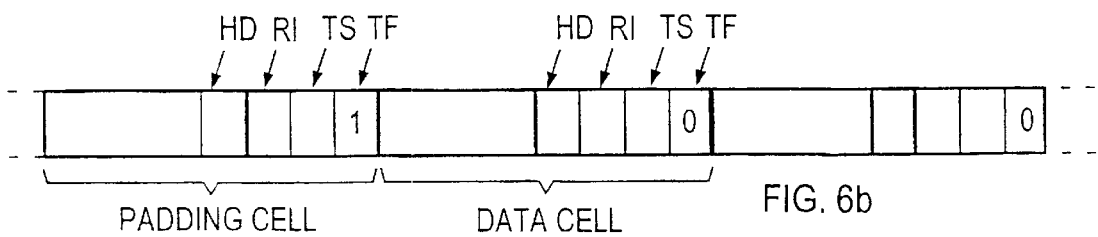

The invention and its preferred embodiments will be described more closely in the following with reference to examples in accordance with FIGS. 2–7d in the accompanying drawings, in-which FIG. 1 depicts the basic principle of an ATM switch, FIG. 2 depicts a switching fabric in accordance with the invention on a general level, FIG. 3 depicts one switching fabric in accordance with the invention, FIG. 4 illustrates time stamping of cells performed at the edge of the switching fabric, FIG. 5 shows the structure of a cell traversing in the switching fabric, FIG. 6a shows an individual switching element in accordance with the invention, FIG. 6b shows a cell queue to be sent to an internal link of the switching fabric, and FIGS. 7a . . . 7d illustrate the operation of the re-sequencing unit included in the switching element.

DETAILED DESCRIPTION OF THE INVENTION

To elucidate the solution in accordance with the invention, the following will first give a description of a switch in accordance with the invention on a general level. At this level, the solutions are still known as such.

The switch can be functionally divided into three parts as shown in FIG. 2: a time stamping unit TSU, a distribution section RRS, and a routing section RS. Only the last two of these contain switching elements, and hence they form the actual switching fabric (or switching matrix).

Ahead of the switching fabric, a time stamping unit TSU for cells is provided, which comprises one time stamping unit $AL_j$ for each input line $I_1$ (i=1 . . . n). These time stamping units stamp the same time on cells arriving substantially simultaneously at the switching fabric. The distribution section RRS routes the cells at random or in accordance with a given predetermined algorithm in such a way that cells arriving at a given input line are distributed to preferably all output lines of the distribution section as evenly as possible. This enables the cell stream to be evenly distributed among all available paths, which will again diminish the internal blocking of the switch. The routing section RS for its part routes the cell to the correct output port on the basis of the routing tag contained in the cell. Hence, the routing section is such that all cells with a given output port address are routed to said output port irrespective of which input port of the routing section they are sent to from the distribution section.

In the switch in accordance with the invention, the path traversed by the cell is thus comprised of a first part selected at random or in accordance with a given algorithm and a second part that is selected on the basis of the routing information in such a way that the cell is directed to the correct output port. Such a structure is previously known.

The type or detailed structure of the switching fabric is not essential to the invention, since the method of the invention can be applied to a wide variety of switching fabric types, such as Benes, Clos or Delta-type switching fabrics. What is essential in the switching fabric is that it comprises a distribution section from each individual input line ($I_j$, j=1 . . . n) of which routes to preferably all output lines ($RO_1$ . . . $RO_k$) of the distribution section can be established, and that it comprises a routing section in which at least one route from each input line ($RO_i$, i=1 . . . k) to the desired output line ($O_i$) (according to the routing information) can be established. The relative order of these parts and their number is not essential to the invention.

FIG. 3 shows a switching matrix in accordance with the invention, which in this example is a three-stage Clos-type switch in which both the first stage and the third stage have k switching elements SE (numbered from one to k). The switching elements in the first stage are denoted by reference SE(1), the switching elements in the second stage by-reference SE(2), and the switching elements in the third stage with reference SE(3). Each switching element in the first stage has n' inputs and m outputs. Each switching element in the third stage for its part has m inputs and n' outputs. The middle stage has a total of m switching elements, each having k inputs and k outputs. The switching elements in the first stage are connected to the second stage in such a way that each of the outputs of the switching element is connected to a different switching element in the second stage. Furthermore, the switching elements in the first switching stage are connected in succession to different inputs of the switching element in the second stage. More precisely, the j:th output of the i:th switching element in the first stage is connected to the i:th input of the j:th switching element in the second stage. The second and third stage are interconnected in a corresponding manner, in other words, the j:th output of the i:th switching element in the second stage is connected to the i:th input of the j:th switching element in the third stage.

In the exemplary case of FIG. 3, the first switching stage serves as a distribution section (RRS) and the two next switching stages as a routing section (RS).

Irrespective of what type of switching fabric is used, each switching element SE(i) of the switch in accordance with the invention comprises functionally two parts: a cell re-sequencing unit UJ and a cell switching unit KY. These units need not necessarily be units clearly distinct from one another and the remaining logic, but it suffices that the respective functions are present in the switching element. The cell re-sequencing unit UJ orders the cells in the correct sequence if they arrive in the incorrect order along different routes. The re-sequencing will be described more closely hereinafter. On account of the re-sequencing performed in the switching element, the cells pass in each internal link (one of which is denoted by reference IL in FIG. 3) in the order indicated by the time stamps, even though the queue may comprise several cells provided with the same time stamp in succession. This feature makes the re-sequencing remarkably simple, as will be seen below.

FIG. 4 illustrates the time stamping performed by the time stamping units. The task of the time stamping unit TSU is, as stated previously, to provide all cells arriving at the switching fabric at substantially the same time with the same time stamp. Cells arrive in succession at each input line in such a way that the next cell starts with the rear border of the preceding cell (since the cells are in practice transported for example in the SDH system, Synchronous Digital Hierarchy, in which idle time slots are filled with "idle" cells). The time axis is divided into successive time slots TS in accordance with the transmission time of the cells, and the time stamp is incremented from one time slot to another. In each time slot, the arriving cell receives a time stamp corresponding to that time slot. In accordance with the invention, a predetermined number of discrete values, for example integers obtained from a modulo counter, are used as a time stamp in such a way that the counter counts time slots from zero to N, whereafter it again starts from zero, etc. Hence, all time stamping units must be approximately in the same phase, although they need not be precisely in the same phase. The figure denotes by reference $\Delta T$ the phase difference that the different time stamping units can have. In practice, the best alternative is that this phase difference is one cell at most, but the method of the invention will be feasible even though the phase difference is greater, yet the delay of the cells may become inordinately long in such a case. In the figure, the time stamps have values $O_i \ldots N$.

In the time stamping units, the cells also receive a routing tag internal to the switch and a field that may indicate whether a padding cell internal to the switch or an ATM cell to be transferred to the network is involved. Hence, each incoming cell to the switch is as shown in FIG. 5. As is known, an actual ATM cell comprises a payload of 48 bytes and a header of 5 bytes. Preferably three identifier fields, each of which comprises an identifier internal to the switch that is removed at the output of the switch, are inserted into this ATM cell. The header field need not necessarily be transported through the switching fabric, but it can be removed at the input port of the switching matrix and a header field provided with new information inserted at the output port of the switching matrix. The routing tag field RI comprises a routing tag internal to the switch, wherewith the cell is routed in the switch (routing section) in the known manner to the correct output port. The time stamp field TS comprises a time stamp inserted by the time stamping unit, which is preferably an integer that is obtained from the modulo counter of the time stamping unit. The type field TF comprises information as to whether the cell is a padding cell internal to the switch or some other cell (i.e. a cell to be transmitted to the network). It is to be noted that padding cells internal to the switch are different from the idle cells that are transported outside the switching fabric (in the network). Padding cells can be generated as late as in the switching fabric, or they can be generated already in the time stamping units to replace idle cells arriving from the network, or the generation can be performed both in the time stamping units and within the switching fabric.

The cell distribution performed by the distribution section can be implemented for example in such a manner that those bits in the routing tag which correspond to the switching stages in the distribution section are formed randomly or in accordance with a given algorithm, and hence the cells are routed in the distribution section at random or in accordance with said algorithm. The entire routing tag can be formed at the input port of the switching matrix, or the part corresponding to the random distribution stages can be left unformed, in which case said stages perform the random distribution independently.

After the above description of the basic structure of the switching fabric, the following will describe the solution in accordance with a preferred embodiment of the invention in detail.

FIG. 6a illustrates a possible structure of an individual switching element SE in the switching fabric. The input of the switching element comprises an input buffer unit IB, having n parallel FIFO-type input buffers IB, (i=1 ... n), one for each input line. The re-sequencing unit UJ comprises a cell storage unit SM, a control unit CU controlling writing into the storage unit and reading out from the storage unit, and a padding cell memory CM in which a padding cell is stored. The input buffers are connected to the storage unit SM via an internal bus B1. The re-sequenced cells are transmitted from the storage unit to the switching unit KY, which is constituted by a bus B2 via which the cells are transferred, and parallel filter units $FU_i$ (i=1 ... m). An output buffer unit OB is incorporated after the filter units, comprising parallel output buffers. $OB_i$ (i=1 ... m) of FIFO type. One filter unit and one output buffer is provided for each output line $OL_i$(i=1 ... m). A corresponding output buffer is connected after each filter unit, and a corresponding reading unit $RU_i$ (i=1 ... m) reading cells onto the corresponding output line (i.e. internal link of the switch) is connected after each output buffer respectively.

Hence, the switching unit KY may be for instance a conventional switching unit implemented with a shared bus and provided with filters. The switching units operate in two modes: on the first side of the switching fabric they operate as random distributors of cells, and on the second side of the switching fabric as routing means routing the cells to the correct output port. For example in the case of FIG. 3, the switching units in the first stage operate as random distributors and the switching units of the second and third stage as routing means.

For multicast transmissions, the switching unit comprises m parallel filtering units. If there was no need for multicast transmissions, one common filtering unit that would route the cell to the correct output queue would suffice in the switching unit.

In order to make the re-sequencing of cells as easy as possible, also the padding cells traversing the switching fabric that are used between the switching elements to maintain the internal links of the switching fabric in cell delineation synchronization are provided with time stamps that are formed on the basis of the time stamps of cells arriving at the switching element. Also other cells that are internal to the switching fabric and distinct from ordinary ATM cells shall be similarly provided with a time stamp. In some switching fabrics, such other internal "padding cells" might be for example fabric control cells to be sent to the switching elements. Cell delineation synchronization in this context means that cells are sent continuously so that there are no "gaps" between the cells in which no cells would pass. In other words, the transmitter and receiver are synchronized in such a way that no information on cell delineation need to be sent separately.

The control unit CU, which controls the reading from the input buffers $IB_i$ and re-sequencing of cells, also keeps track of which is the smallest time stamp carried by the cells currently present in the storage unit SM (or in cells read from the input buffers if all cells are not stored in the re-sequencing unit). The padding cell memory CM stores a padding cell internal to the switching fabric as shown in FIG. 5, and the control unit updates the time stamp of this cell with the value that is currently the smallest tire stamp contained in the cells to be forwarded from the storage unit SM. Each reading unit $RU_i$ reads cells at the same constant rate onto the respective link. If an output buffer is empty, the pertinent reading unit copies one or more cells from the padding cell memory onto the outgoing internal link to maintain the cell synchronization. Thus, even if no actual data cells arrived at the output port for a considerable time (in which case the output buffer is emptied), padding cells provided with a time stamp nevertheless exit from that output port.

Hence, a continuous cell queue in accordance with FIG. 6b is sent from the switching unit to each internal link ($OL_i$), in which queue each cell carries a time stamp regardless of whether a padding cell internal to the fabric (the value of the type field TF of which is denoted by one) or some other cell, such as a normal data cell (the value of the type field of which is denoted by zero), is concerned.

In a conventional prior art switching fabric, padding cells are not transported through the switching element, as the padding cells can be terminated at the input of the switching element and regenerated at the output of the switching element since the padding cells are similar. On the other hand, in a switching fabric operating in accordance with the invention the padding cells are transported up to the re-sequencing unit, or at least a time stamp is stored from the padding cells for re-sequencing.

Since the padding cells in the switching fabric of the invention are similar except for the time stamp, it suffices that only the time stamps thereof are carried over as information to the re-sequencing unit. Neither are the padding cells sent through the switching unit, but a padding cell provided with the correct time stamp is generated at the output port of the switching element by reading the padding cell provided with the correct time stamp out from the padding cell memory CM. Only data cells traverse the switching unit KY.

Each (data) cell read out from the re-sequencing unit is transferred via bus B2 to each filtering unit. The filtering units read from the cell routing tag the bits corresponding to the pertinent switching stage, and the filter units whose output port corresponds to the address indicated by the bits pass the cell and the other filtering units discard the cell. Instead of the routing tag, an address indicating the output port may also be used as routing information in a known manner.

Figure 7A:
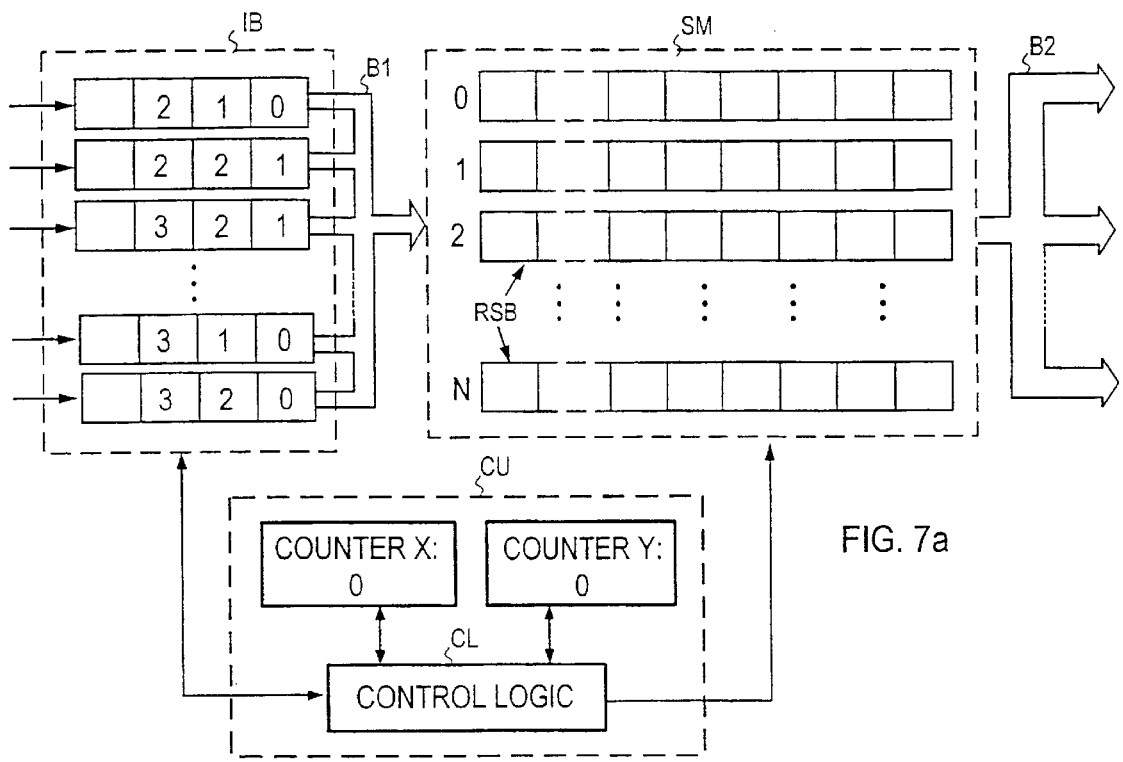

FIGS. 7a . . . 7d illustrate in detail the operational principle of the re-sequencing unit UJ, showing in the different figures the cell reading and writing steps by way of example. The storage unit SM comprises N+1 FIFO-type buffers RSB, that is, one buffer for each time stamp. The figures show beside each buffer the time stamp that the buffer corresponds to. Furthermore, the figures show input buffers $IB_1$ . . . $IB_n$ from which the cells are read out. Each cell in the input buffers is denoted by a number corresponding to the value of the time stamp carried by said cell. The cells are read out from the input buffers into the storage unit by going through the input queues in succession and reading the cell at the head of each input queue. If the cell is a data cell, it is written via bus B1 into the storage unit. The control logic stores the time stamps of padding cells but does not write the content of these cells into the storage unit. To elucidate the writing and reading mechanism of the buffers RSB, the figures only show the re-sequencing of those cells which are present at the input buffers in the initial situation shown in FIG. 7a.

The control unit CU has two counters, counter X and counter Y, which are implemented for example in the form of two registers. The control logic CL, controlling the reading and writing, increments the counters and utilizes them in the relative phasing of the read and write operations. The writing takes place during each reading cycle of the input queues into a given group of time stamp buffers, and said group changes as the time stamps read out from the input queues change. The phasing illustrates from which time stamp buffer the reading out takes place simultaneously as writing into a given group of buffers is effected.

Counter X indicates the smallest time stamp the cell according to which was read out from the input queues in conjunction with each reading cycle (during-one reading cycle, a cell is read out from the head of each queue, by performing the reading one queue at a time). On account of the revolution of the counter, the smallest time stamp is found by comparing the read time stamp values with the current value of counter X, for example in such a way that the current value of counter X is subtracted from the read time stamp value, in which case the result modulo(N+1) defines the "smallness", i.e. The time distance of the read time stamp value from the current value of X measured in the augmenting direction. The smallest time stamp in a reading cycle thus signifies the time stamp whose time distance to the current value of counter X (i.e. to the smallest time stamp of the previous cycle) is the smallest.

Since in each switching element the cells bound for an individual output line are ordered in the correct sequence, the cells in each input queue are in the order indicated by the time stamps. Thus, the value of counter X need not be decremented, except when the time stamp counter wraps (from N to zero). The value of counter Y on the other hand, indicates the queue of the re-sequencing unit (time stamp buffer) wherefrom the cells are read out into the switching unit. The reading takes place by emptying one buffer (RSB) at a time. Each time a queue is emptied, the value of counter Y can be incremented by one and the method can proceed to emptying the next queue. The control logic CL only need to attend to the fact that the value of counter Y never exceeds that of counter X. Hence, for counter values $Y \leq X$ always applies. This condition can be maintained in such a way that if the value of counter Y tends to become greater than that of counter X, one awaits the increasing of the value of counter X to increment the value of counter Y. If Y=X, the writing takes place into the same queue that the cells are read out from. Reading out from the storage means and writing into the storage means can be implemented fully independently of each other, as long as said condition is maintained.

In the initial situation of FIG. 7a, each counter is presumed to have the value zero.

Figure 7B:
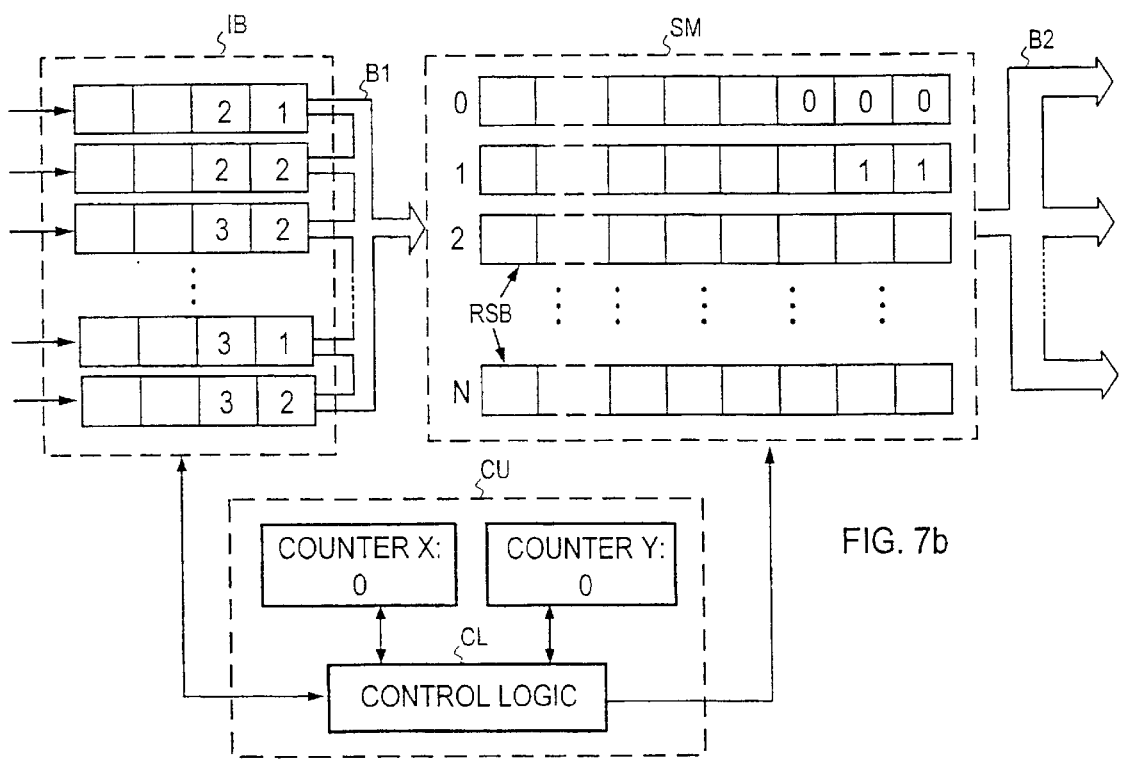

After the first reading cycle of the input buffers, the situation is as shown in FIG. 7b, that is, the cell at the head of each input buffer has been transferred into the buffer RSB corresponding to the time stamp. Since the smallest time stamp that was read out from the input buffers was zero, the value of each buffer still remains zero. At this stage, reading out from the buffer corresponding to time stamp zero can be commenced.

Figure 7C:
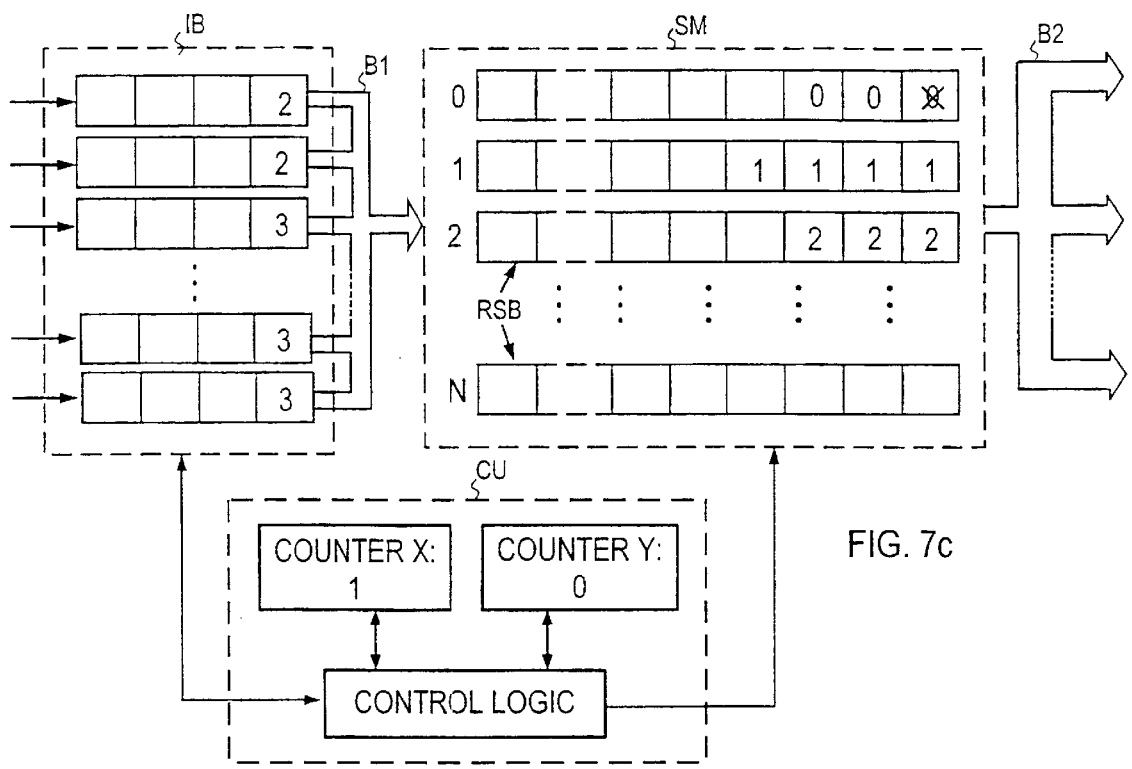

FIG. 7c shows the situation after the second reading cycle of the input buffers. Since the smallest time stamp that was read out from the input buffers in this cycle had the value one, the control logic increments counter X by one. In this example, the value of counter Y remains one integer smaller than that of counter X, and hence the value of counter Y does not change yet. Thus, at this stage the reading of the buffers is still at the buffer corresponding to time stamp zero. The cells already read out are checked off.

Figure 7D:
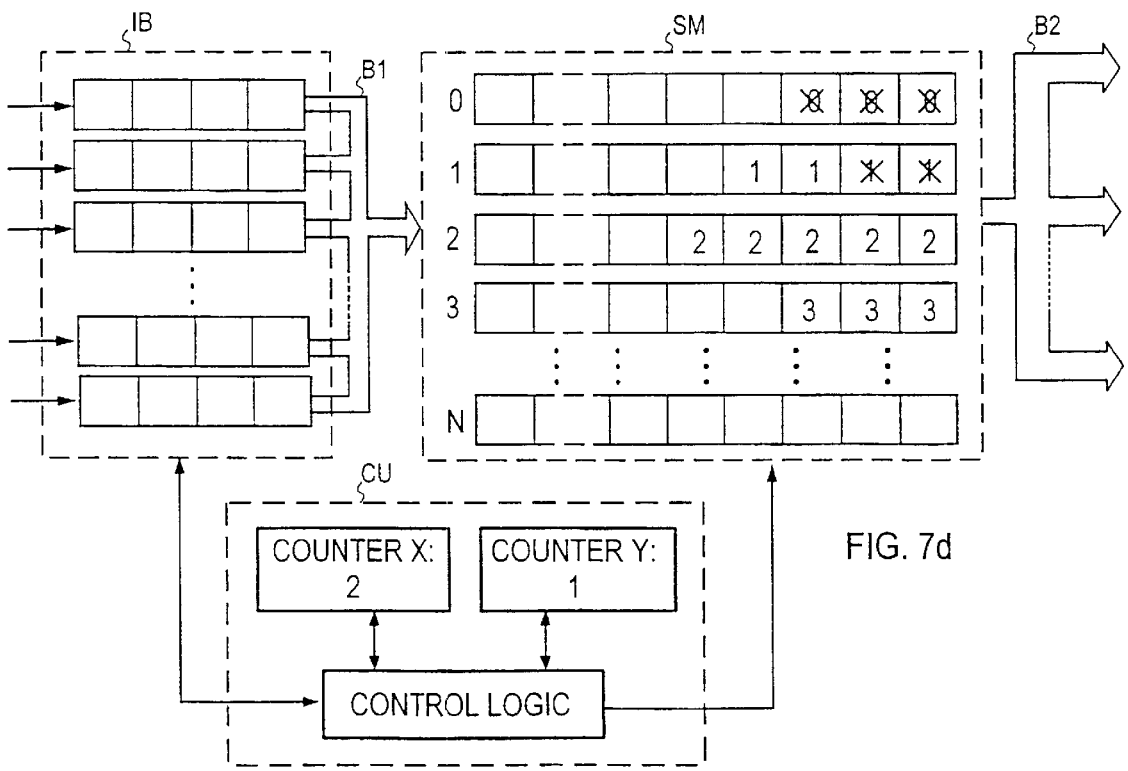

In the situation shown in FIG. 7d, the third reading cycle of the input buffers has been carried out, as a result of which counter X has the value 2. The buffer corresponding to time stamp zero has been emptied and the value of counter Y has increased to one, and hence reading takes place from the buffer corresponding to time stamp one, into which cells are no longer introduced in the course of this time stamp cycle on account of the value of counter X.

In the example of FIGS. 7a...7d, to illustrate the cell sequencing principle all cells are shown as being transferred into the time stamp buffers. In practice, however, it is preferable to proceed in such a way that each time it is found in connection with reading the input, queues that the cell is a padding cell, only the time stamp thereof is stored and it is studied, similarly as with data cells, whether said time stamp is the smallest in the reading cycle. The content of the padding cell is not written into the time stamp buffers. Alternatively, all cells can be written into the time stamp buffers but the cells are not read via bus B2 into the switching unit if it is detected from the identifier field TF that they are padding cells within the fabric. The last-mentioned alternative is more disadvantageous in that it requires higher buffering capacity in the re-sequencing unit.

The value of counter Y can be directly taken as the time stamp by means of which the time stamp of the padding cell present in the padding cell memory CM is maintained. If one output queue in the switching unit is empty and one or more padding cells are read onto said output line from the padding cell memory, one can be certain that the buffers RSB do not contain cells that would have a smaller time stamp than the value of counter Y. Hence, the position of the padding cell in the queue will be as indicated by the time stamp.

In the solution described above, each input queue ($IB_i$) in the switching element can have the length of one cell only if reading out from the input queue takes place in time with the arrival of cells.

The length of the queues (buffers) in the re-sequencing unit must be at least equal to the number of input ports in the switching element. On the other hand, the length need not be very much greater than this, since it is highly improbable that a large number of data cells provided with the same time stamp should arrive at the same switching element. The maximum delay of cells through the switching fabric expressed as cells is a sufficient upper limit for the number of queues (N+1), but a feasible value may in practice be much smaller than this.

Even though the invention has been explained in the foregoing with reference to the examples in accordance with the accompanying drawings, it is evident that the invention is not so restricted, but it can be varied within the scope of the inventive idea set forth in the appended claims. The following is a brief description of possible variations.

Even though the preferable method is to use padding cells to carry time information, it is to be noted that the use of the re-sequencing principle of the invention does not necessarily require time stamps to be transported in padding cells (i.e., padding-cells are not indispensable, but it suffices that the time stamps are transported in data cells), and thus the padding cell memory CM is not in use either. In that case, it must only be awaited, if one input buffer in the switching element is emptied, until more data cells arrive thereat before the value of counter X can be incremented. There will be an increase in delays, but the method of the invention nevertheless works.

One way of preventing the emptying of the input buffers of the switching element (or at least diminishing the likelihood of their being empty) and thereby of reducing the delay, if it is not wished that the switching element generates padding cells provided with time stamps, is to send from the input ports of the switching fabric time-stamped padding cells, either randomly to some output ports or as multicast transmissions to all output ports. The switching elements can transmit these padding cells further if the buffers of the elements are empty or nearly empty. Otherwise they can discard the padding cells in the normal way.

In principle, it is also possible to transmit the time stamp related to the packet (cell) by another route, for example through a parallel link on which the packets are not transported. In that case, the re-sequencing is otherwise as explained above, but the time stamp related to the packet is not read from the packet but from a separate memory location at which the time stamp information is stored. The time stamp is thus physically or logically attached to the packet. It is also possible that a continuous cell queue is not transmitted on the internal link, but still continuous time stamp information is transmitted through a parallel link, for example, similarly as was done with padding cells above. In other words, information on the smallest time stamp read out from the input queues continuously passes for example through a parallel link to the next switching unit, similarly as it passes in the padding cells.

Part of the padding cells can also be left without a time stamp, or they can be provided with an identifier indicating that the time stamp is the same as in the previous cell. The time stamps can thus also be transmitted as information indicating the change of the time stamp value relative to the previous time stamp value.

Also the hardware configuration may vary in many ways. For example, the switching element can be implemented in a variety of ways, such as a space or time divisioned switching element, an input or output buffered switching element, or a shared buffer or shared bus switching element. Also the switch part of the switching element can be implemented in many ways known per se. In addition to the fact that the switch part can be a bus-type switch part as described above, in which the cells are transferred via a bus in a time divisioned manner one cell at a time, the switch part can be implemented for example as a space divisioned full mesh switch part with an arbiter at each output port, which sees all cells bound for that output port and selects one of them according to a given rule and prevents the other cells from being transmitted. Also the buffering of the switching element can be realized by known methods either as input or output buffering or as a combination of these. The cells can also be stored in the shared memory of the switching element and only the addresses of the cells (referring to the shared memory) transferred in the queue. A cell queue, as the other terms used in this connection, is to be so construed that the practical implementation of the apparatus may vary as long as the implementation is logically or functionally analogous to the above. Also, if the structure of the switching fabric is such that one or more switching stages in which the order of the cells does not change can be added thereto, there is no need to carry out re-sequencing in all switching elements of the switching fabric. The padding cells can also be extracted from the input queues of the switching element for processing and stored in separate input queue-specific memory locations, for instance. When an input buffer becomes empty, the time stamps of the padding cells stored in the separate memory area can be used for the operation of the control unit in accordance with the method described above.

What is claimed is:

1. A switching fabric arrangement for a packet-switched telecommunications network, through which switching fabric arrangement packets are sent, switching fabric arrangement comprising:

several input ports and several output ports, several switching elements, each comprising several inputs and several outputs, said switching elements being arranged in succession to form several successive switching stages and being interconnected with internal links leading from one switching stage to another switching stage, a connection being established through the switching elements and internal links from an input port to a desired output port, wherein packets arriving at the switching fabric are assigned a time stamp depending on a time of arrival of the packets, each switching element routes a packet arriving at its input to at least one of its outputs based on routing information associated with the packet time stamp information relating to the packets to be transported is transmitted to at least some of the switching elements, and in at least some of the switching elements, a relative order of the packets to be sent is established based on the time stamp information received at the switching elements so that on each outgoing link from the switching element, the packets are arranged according to an order indicated by the time stamps, wherein a predetermined number of discrete values are used as the time stamps, in the switching elements in which the relative order of the packets to be sent is established based on the time stamps, wherein time stamp-related buffers are used, incoming packets are stored in the time stamp-related buffers so that each packet arriving from outside the switching fabric is stored in the time stamp-related buffer according to a corresponding time stamp, and the time stamp-related buffers are emptied by reading one time stamp-related buffer at a time, and each packet read out from the time stamp-related buffer is routed to the output indicated by an address contained in the packet.

2. A switching fabric arrangement as claimed in claim 1, wherein the time stamp information is transmitted to the switching elements in such a way that the time stamp information is sent from the at least some of the switching elements based on the time stamp information received in said switching element to the switching elements of a next switching stage.

3. A switching fabric arrangement as claimed in claim 2, wherein the time stamp information is transmitted substantially continuously from the switching elements to the switching elements of the next switching stage.

4. A switching fabric arrangement as claimed in claim 3, further comprising a packet generating unit for generating padding packets, wherein the padding packets are internal to the switching fabric, contain the time stamp information, and are transmitted within the switching fabric.

5. A switching fabric arrangement as claimed in claim 1, further comprising a packet generating unit for generating padding packets, wherein the padding packets are internal to the switching fabric, contain time stamp information having values that are kept constant within the switching fabric, and are transmitted from the input ports of the switching fabric.

6. A switching fabric arrangement as claimed in claim 4, wherein the packets arriving at the switching element are stored in an input buffer corresponding to the input, and wherein the switching elements in which the relative order of the packets to be sent is established based on the time stamps wherein the packets are read out from input buffers, and at least some of the packets read out are transferred from the input buffers to the time stamp-related buffers, information is simultaneously maintained on each packet read out from the input buffers and having the smallest time stamp, and packets are read out from each time stamp-related buffers, wherein the time stamp is either smaller than or equal to said smallest time stamp.

7. A switching fabric arrangement as claimed in claim 6, wherein the routed packets are stored in an output buffer according to a corresponding routing address, and packets are read out from the output buffer onto an internal link corresponding to the output buffer, a padding packet is stored in a memory of the switching element, a time for the padding packet read from the time stamp-related buffers and having the smallest time stamp is continuously maintained, and when the output buffer is empty, at least one padding packet is read out from said memory to form a continuous packet queue onto said internal link.

8. A switching fabric arrangement as claimed in claim 6, wherein when the packets are read out from the input buffers, the time stamp is stored from each packet read out from the input buffers, and only the packets that have arrived from outside the switching fabric are transferred to the time stamp-related buffers.

9. A switching fabric arrangement as claimed in claim 6, wherein, in the switching elements in which the relative order of the packets to be sent is established based on the time stamps, the packets are continuously read out from the time stamp-related buffer, and the time stamp equals to said smallest time stamp.

* * * * *